US010812314B2

(12) United States Patent
Wang

(10) Patent No.: US 10,812,314 B2
(45) Date of Patent: Oct. 20, 2020

(54) METHODS AND APPARATUSES FOR PUSHING A MESSAGE

(71) Applicant: ALIBABA GROUP HOLDING LIMITED, George Town, Grand Cayman (KY)

(72) Inventor: Junxiang Wang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 79 days.

(21) Appl. No.: 15/675,208

(22) Filed: Aug. 11, 2017

(65) Prior Publication Data

US 2017/0339001 A1    Nov. 23, 2017

Related U.S. Application Data

(63) Continuation of application No. PCT/CN2016/073275, filed on Feb. 3, 2016.

(30) Foreign Application Priority Data

Feb. 12, 2015   (CN) .......................... 2015 1 0076896

(51) Int. Cl.
*H04L 29/08* (2006.01)
*H04L 12/58* (2006.01)
(Continued)

(52) U.S. Cl.
CPC .... *H04L 29/08693* (2013.01); *H04L 12/1859* (2013.01); *H04L 29/08* (2013.01);
(Continued)

(58) Field of Classification Search
CPC ..... H04L 12/1859; H04L 51/14; H04L 51/32; H04L 51/36; H04L 67/26; H04L 29/08;
(Continued)

(56) References Cited

U.S. PATENT DOCUMENTS 7,475,395 B2 *  1/2009  Etelapera .................. G06F 8/65
                                                        717/172
8,634,810 B2 *  1/2014  Barkie ................... H04W 12/02
                                                        455/412.2
(Continued)

FOREIGN PATENT DOCUMENTS

CN       103095732 A      5/2013
CN       103348663 A     10/2013
(Continued)

OTHER PUBLICATIONS

First Office Action dated Aug. 1, 2018, issued by the State Intellectual Property Office of the People's Republic of China in counterpart Chinese Patent Application No. 201510076896.6.
(Continued)

*Primary Examiner* — George C Neurauter, Jr.
(74) *Attorney, Agent, or Firm* — Finnegan, Henderson, Farabow, Garrett & Dunner LLP

(57) ABSTRACT

Apparatuses and methods are disclosed for pushing a message. An exemplary method may include extracting, when the message to be pushed is detected, user information and application information in the message. The method may also include acquiring link information corresponding to the user information and the application information. The method may further include determining registered devices of the user information and registered applications on each registered device according to the user information, the application information, and the link information. The method may further include adding, when a plurality of registered applications on a registered device exist, identification information about the plurality of registered applications to the message corresponding to the registered device. The identification information and message contents contained in the message may be extracted and the message contents may be respectively sent to each registered appli-
(Continued)

cation corresponding to the identification information by the registered device after receiving the message.

9 Claims, 13 Drawing Sheets

(51) Int. Cl.
*H04L 12/18* (2006.01)
*H04W 4/12* (2009.01)

(52) U.S. Cl.
CPC ............ *H04L 51/00* (2013.01); *H04L 51/043* (2013.01); *H04L 51/14* (2013.01); *H04L 51/32* (2013.01); *H04L 51/36* (2013.01); *H04L 67/26* (2013.01); *H04L 67/303* (2013.01); *H04L 67/306* (2013.01); *H04W 4/12* (2013.01); *Y02D 30/40* (2018.01)

(58) Field of Classification Search
CPC ..... H04L 51/00; H04L 51/043; H04L 67/303; H04L 67/306; H04L 29/08693; H04W 4/12; Y02D 30/40

See application file for complete search history.

(56) References Cited

U.S. PATENT DOCUMENTS

| | | | | |
|---|---|---|---|---|
| 8,880,624 | B2* | 11/2014 | Cundill | H04L 67/26 |
| | | | | 709/206 |
| 9,232,339 | B2* | 1/2016 | Lynes | H04L 12/1859 |
| 9,253,644 | B2* | 2/2016 | Barkie | H04W 12/02 |
| 9,288,164 | B2* | 3/2016 | Vyrros | H04W 4/12 |
| 9,450,904 | B2* | 9/2016 | Wheeler | H04L 51/24 |
| 9,537,812 | B2* | 1/2017 | Lewis | H04L 51/24 |
| 9,615,259 | B2* | 4/2017 | Barkie | H04W 12/02 |
| 9,654,572 | B2* | 5/2017 | Connelly | H04L 63/102 |
| 9,699,625 | B2* | 7/2017 | Kaplinger | H04L 69/18 |
| 9,706,371 | B2* | 7/2017 | Kaplinger | H04L 69/18 |
| 9,774,697 | B2* | 9/2017 | Li | H04L 67/26 |
| 9,866,510 | B2* | 1/2018 | Wheeler | H04L 51/24 |
| 9,900,837 | B2* | 2/2018 | Chen | H04L 67/26 |
| 9,973,588 | B2* | 5/2018 | Vyrros | H04L 9/30 |
| 10,021,698 | B2* | 7/2018 | Thies | H04L 51/14 |
| 10,148,449 | B2* | 12/2018 | Lee | H04L 12/1859 |
| 10,210,480 | B2* | 2/2019 | Chaudhri | G06Q 10/10 |
| 10,225,359 | B2* | 3/2019 | Moore | H04L 67/26 |
| 10,237,356 | B2* | 3/2019 | Connelly | H04L 63/102 |
| 10,574,770 | B2* | 2/2020 | Vyrros | H04L 67/20 |
| 2003/0023690 | A1* | 1/2003 | Lohtia | H04L 29/06 |
| | | | | 709/206 |
| 2010/0227632 | A1* | 9/2010 | Bell | H04L 12/1859 |
| | | | | 455/466 |
| 2011/0026704 | A1* | 2/2011 | Connelly | H04L 63/102 |
| | | | | 379/219 |
| 2011/0289172 | A1* | 11/2011 | Marcellino | H04L 51/24 |
| | | | | 709/206 |
| 2011/0314064 | A1* | 12/2011 | Jeyaseelan | H04L 51/24 |
| | | | | 707/803 |
| 2012/0173610 | A1* | 7/2012 | Bleau | H04L 67/26 |
| | | | | 709/203 |
| 2012/0303774 | A1 | 11/2012 | Wilson et al. | |
| 2013/0047034 | A1* | 2/2013 | Salomon | H04W 4/00 |
| | | | | 714/18 |
| 2013/0084896 | A1* | 4/2013 | Barkie | H04W 12/02 |
| | | | | 455/466 |
| 2014/0122623 | A1* | 5/2014 | Nerieri | H04L 67/306 |
| | | | | 709/206 |
| 2014/0195620 | A1* | 7/2014 | Srinivasan | H04L 51/14 |
| | | | | 709/206 |
| 2014/0201289 | A1* | 7/2014 | Wheeler | G06Q 10/107 |
| | | | | 709/206 |
| 2015/0026324 | A1* | 1/2015 | Rheinheimer | H04L 41/0604 |
| | | | | 709/223 |
| 2015/0026325 | A1* | 1/2015 | Rheinheimer | H04L 41/0604 |
| | | | | 709/223 |
| 2015/0113442 | A1* | 4/2015 | Aghadavoodi Jolfaei | |
| | | | | H04L 67/26 |
| | | | | 715/753 |
| 2015/0120849 | A1* | 4/2015 | Thies | H04W 72/0493 |
| | | | | 709/206 |
| 2018/0167477 | A1* | 6/2018 | Xie | H04L 67/22 |

FOREIGN PATENT DOCUMENTS

| | | |
|---|---|---|
| CN | 103500266 A | 1/2014 |
| CN | 104301203 A | 1/2015 |
| JP | 2014503152 A | 2/2014 |
| KR | 20130103161 A | 9/2013 |
| KR | 1020130109229 | 10/2013 |
| WO | WO2010133035 A1 | 11/2010 |
| WO | WO 2013105809 A1 | 7/2013 |
| WO | WO 2016/127884 A1 | 8/2016 |

OTHER PUBLICATIONS

PCT International Search Report dated May 5, 2016, issued in corresponding International Application No. PCT/CN2016/073275 (4 pages).
PCT Written Opinion dated May 5, 2016, issued in corresponding International Application No. PCT/CN2016/073275 (9 pages).
Supplementary European Search Report dated Feb. 5, 2018, issued in corresponding International Application No. EP 16 74 8685 (2 pages).
The extended European Search Report, pursuant to Rule 62 EPC, the Supplemental European Search Report (Art. 153(7) EPC) and the European Search Opinion, dated Feb. 14, 2018, issued in related International Application No. 16748685.1-1213 / 3258653 (PCT/CN2016/073275) (8 page).
Japanese Patent Office, Notice of Reasons for Refusal issued in corresponding Japanese Patent Application No. 2017-542024, dated Nov. 14, 2019, 10 pages.
Korean Patent Office, Notice of Reasons for Refusal issued in corresponding Korean Patent Application No. 10-2017-7025126, dated Dec. 31, 2019, 12 pages.
Indian Examination Report issued in corresponding Indian Patent Application No. 201737030240, dated Jun. 15, 2020, 8 pages.

* cited by examiner

METHODS AND APPARATUSES FOR PUSHING A MESSAGE

CROSS REFERENCE TO RELATED APPLICATION

This application claims priority to International Application No. PCT/CN2016/073275, filed on Feb. 3, 2016, which claims the benefits of priority to Chinese Application No. 201510076896.6, filed Feb. 12, 2015, both of which are incorporated herein by reference in their entireties.

TECHNICAL FIELD

The present application relates to message pushing technologies, and more particularly, to message pushing methods and apparatuses.

BACKGROUND

With continuous development of communication technologies, message pushing techniques may have been applied to numerous scenarios. For example, in a mobile client application, data may be actively pushed to a mobile device from a server. As another example, in a Java platform enterprise edition (Java FE) application, data may be actively pushed from one application system to another application system.

SUMMARY

The present disclosure provides message pushing methods and apparatuses to solve deficiency in the related art.

In some aspects, the present disclosure is directed to a method for pushing a message. The method may include extracting, when the message to be pushed is detected, user information and application information in the message. The method may also include acquiring link information corresponding to the user information and the application information. The method may further include determining registered devices of the user information and registered applications on each registered device in accordance with the user information, the application information, and the link information. In addition, the method may include adding, when a plurality of registered applications on a registered device exist, identification information about the plurality of registered applications to the message corresponding to the registered device. The identification information and message contents contained in the message may be extracted, and the message contents may be respectively sent to each registered application corresponding to the identification information by the registered device after receiving the message.

In some aspects, the present disclosure is directed to another method for pushing a message. The method may include receiving a pushed message. The method may also include extracting message contents and identification information contained in the pushed message. The method may further include determining a target application corresponding to each piece of the identification information, and sending the message contents to each corresponding target application.

In some aspects, the present disclosure is directed to an apparatus for pushing a message. The apparatus may include an extraction unit configured to extract, when the message to be pushed is detected, user information and application information in the message. The apparatus may also include an acquisition unit configured to acquire link information corresponding to the user information and the application information. The apparatus may further include a determination unit configured to determine registered devices of the user information and registered applications on each registered device in accordance with the user information, the application information, and the link information. In addition, the apparatus may include an adding unit configured to add, when a plurality of registered applications on a registered device exist, identification information about the plurality of registered applications to the message corresponding to the registered device. The identification information and message contents contained in the message may be extracted, and the message contents may be respectively sent to each registered application corresponding to the identification information by the registered device after receiving the message.

In some aspects, the present disclosure is directed to another apparatus for pushing a message. The apparatus may include a receiving unit configured to receive a pushed message. The apparatus may also include an extraction unit configured to extract message contents and identification information contained in the pushed message. The apparatus may further include a determining and sending unit configured to determine a target application corresponding to each piece of the identification information, and send the message contents to each corresponding target application.

Message pushing methods and apparatuses in the present disclosure may include acquiring, when a message to be pushed is detected, user information and application information in the message and the corresponding link information to learn real-time, accurate login conditions of the user information. By adding identification information about a plurality of registered applications corresponding to the registered device to the message, only one message may need to be sent to the same registered device. All the plurality of registered applications may receive their corresponding message contents. It may be helpful to decrease the data volume of messages to be pushed, and may reduce power consumption of the registered device.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
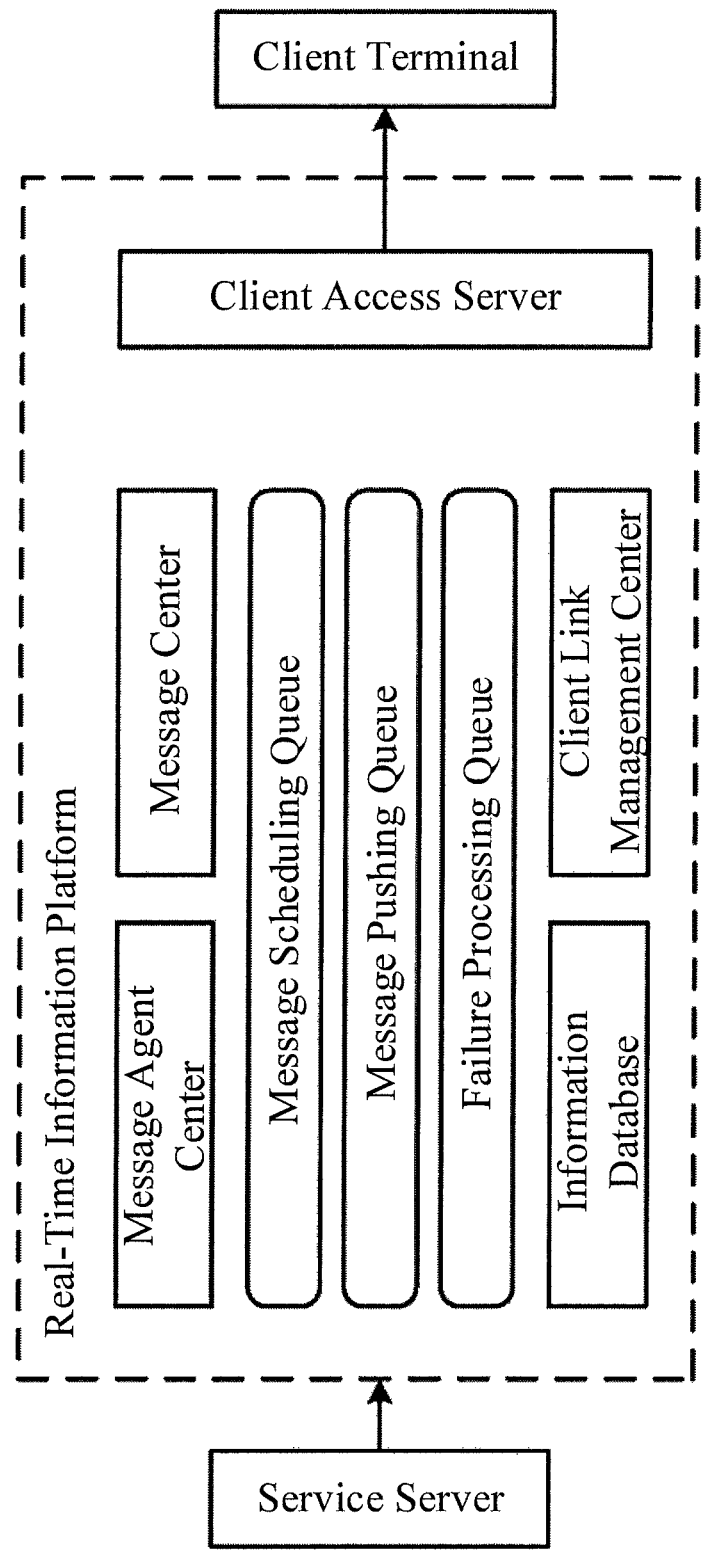
FIG. 1 illustrates a schematic structural diagram of an exemplary real-time message platform, according to some embodiments of the present disclosure.
Figure 2:
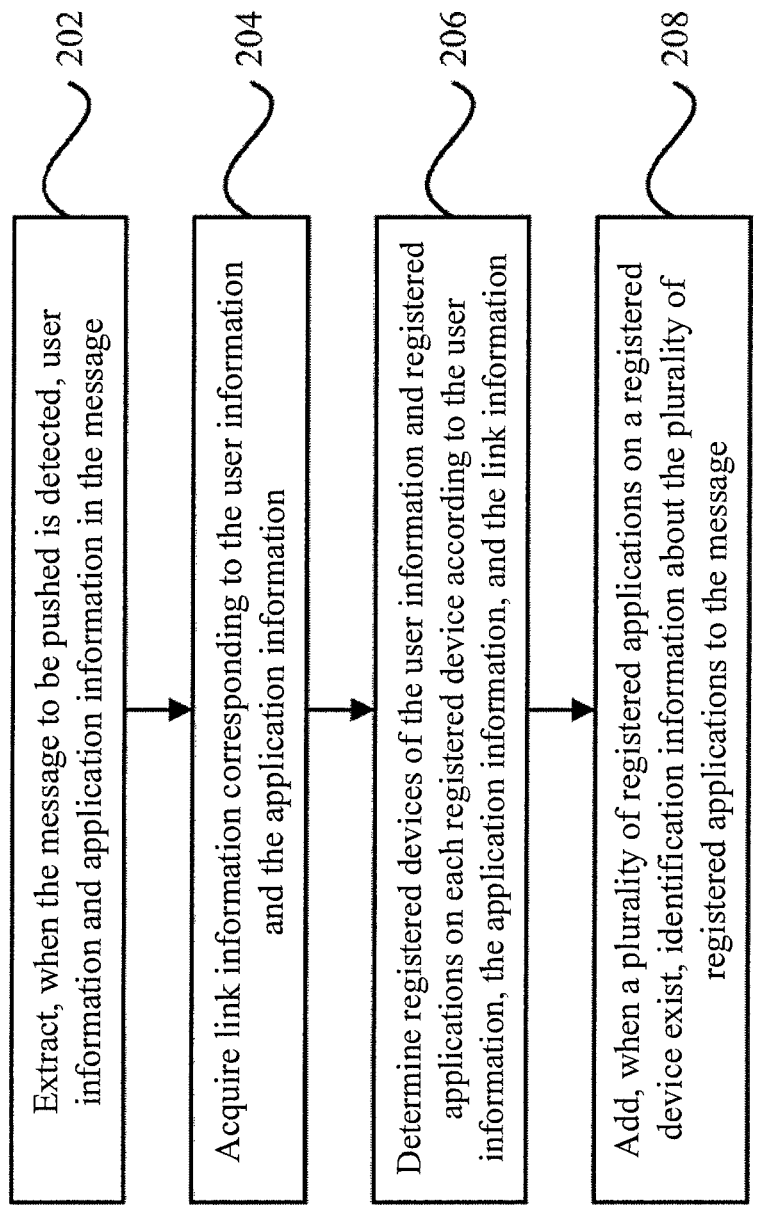
FIG. 2 is a flow chart of an exemplary method for pushing a message, according to some embodiments of the present disclosure.

FIG. 1 illustrates a schematic structural diagram of an exemplary real-time message platform, according to some embodiments of the present disclosure. As shown in FIG. 1, a service message from a service server may be processed by a real-time message platform and may be pushed to a client. FIG. 2 is a flow chart of an exemplary method for pushing a message, according to some embodiments of the present disclosure. The method may be applied to a message center (MSCenter) shown in FIG. 1. The method may include the following steps:

Step 202: Extract, when the message to be pushed is detected, user information and application information in the message.

Step 204: Acquire link information corresponding to the user information and the application information.

In some embodiments, after a user logs in to an account on a device, the device may establish a link with a client access server (MSNode), and may initiate a registration request based on the link. The registration request may contain user information and application information. In some embodiments, the MSNode may also read link information from the link. The MSNode may send the link information, the application information, and the user information to a client link management center (CMCenter) for storing the correspondence between them.

The user information may be information representing the user identity, such as user account information for login. The application information may be information representing a corresponding application program on the device, such as an application ID. The link information may correspond to information about a link that may be established with the MSNode and/or information about a device corresponding to the link, such as a link ID and/or a device ID. Each device may establish a plurality of links with the MSNode.

Step 206: Determine registered devices of a user account and registered applications on each registered device in accordance with the user information, the application information, and the link information.

In some embodiments, the MSCenter may acquire, from each message to be pushed, user information about one or more users and one or more pieces of application information corresponding to each piece of the user information to form one or more "user information—application information" pairs. In addition, combining with the link information acquired at the CMCenter, the method may also include determining the real-time login state of the user account.

In some embodiments, if the MSCenter acquires, according to a "user information—application information" pair, one corresponding piece of link information or a plurality of pieces of identical link information from the CMCenter, it may indicate that the user may log in by the user account on one application program on one device.

In some embodiments, if the MSCenter acquires, according to a "user information—application information" pair, a corresponding plurality of pieces of different link information from the CMCenter, it may indicate that the user may log in by the same user account on the same application program on a plurality of devices.

In some embodiments, if the MSCenter acquires, according to a plurality of "user information—application information" pairs corresponding to the same user account, the corresponding one piece of link information or a plurality of pieces of identical link information from the CMCenter, it may indicate that the user may log in by the same user account on a plurality of application programs on one device.

Step 208: Add, when a plurality of registered applications on a registered device exist, identification information about the plurality of registered applications to the message corresponding to the registered device. The identification information and message contents contained in the message may be extracted and the message contents may be respectively sent to each registered application corresponding to the identification information by the registered device after receiving the message.

In some embodiments, the identification information about the registered applications may be contained in the corresponding application information. For example, the identification information may be the application IDs or other types of identification to distinguish the plurality of registered applications. By adding identification information about a plurality of registered applications to a message to be pushed, the method may need only one message to be pushed to a device. The plurality of registered applications may all receive the corresponding message contents. It may be helpful to decrease the data volume of messages to be pushed, and may reduce power consumption of the device.

Figure 3:
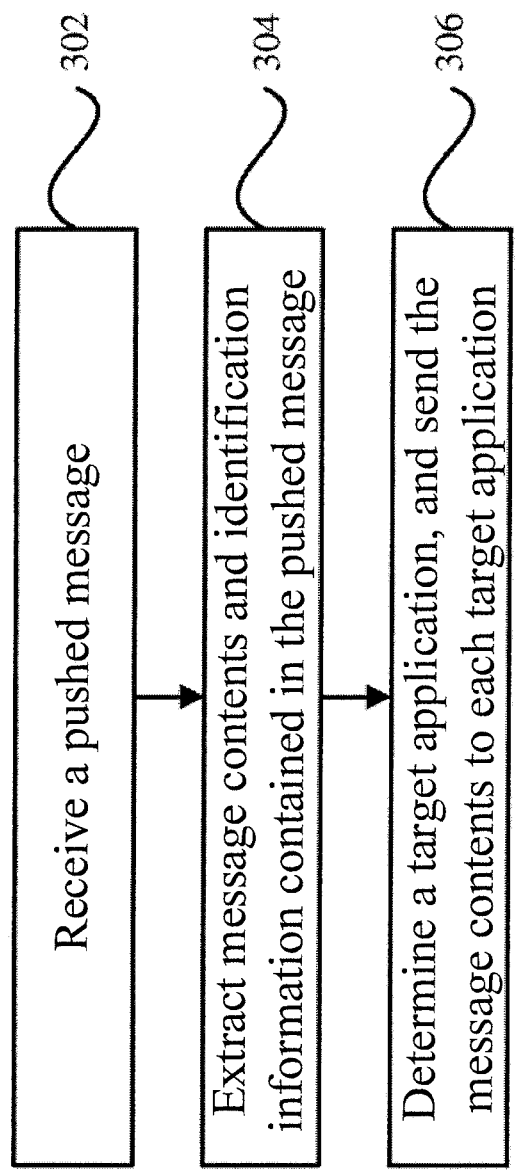
FIG. 3 is a flow chart of another exemplary method for pushing a message, according to some embodiments of the present disclosure.

Corresponding to the processing procedure of the MSCenter described above, the same registered device above may process a received pushing message via a processing procedure shown in FIG. 3 to ensure that a plurality of registered applications may all receive the message contents. FIG. 3 is a flow chart of another exemplary method for pushing a message, according to some embodiments of the present disclosure. As shown in FIG. 3, the method may be applied to a terminal or a device. The method may include the following steps:

Step 302: Receive a pushed message.

In some embodiments, the pushed message in step 302 may be the message to be pushed shown in FIG. 2.

Step 304: Extract message contents and identification information contained in the pushed message.

Step 306: Determine a target application corresponding to each piece of the identification information, and send the message contents to each corresponding target application.

Accordingly, the methods for pushing a message in the present disclosure may include acquiring, when a message to be pushed is detected, user information and application information in the message and the corresponding link information to learn real-time, accurate login conditions of a user account. By adding identification information about a plurality of registered applications corresponding to the registered device to the message, only one message may need to be sent to the same registered device. All the plurality of registered applications may receive their corresponding message contents. It may be helpful to decrease the data volume of messages to be pushed, and may reduce power consumption of the registered device.

In addition to the above methods for a single device, the present disclosure is also directed to methods for a plurality of devices. When a plurality of registered devices corresponding to the same user account exist, the message to be pushed may be respectively pushed to each of the registered devices.

In some embodiments, the MSCenter may duplicate the message to obtain a plurality of messages that may be one-to-one corresponding to the plurality of registered devices. The MSCenter may also acquire a node ID of a client access server corresponding to each of the registered devices, and may add each node ID to each corresponding message to be pushed accordingly. The MSCenter may add these messages each containing the node ID to a message pushing queue. Finally, the MSNode may push these messages in the message pushing queue.

In some embodiments, a user may log in by an account respectively via applications on a plurality of devices. The plurality of devices may all receive the corresponding pushing messages to ensure that the user may be able to view the pushed message via any one of the devices.

Figure 4:
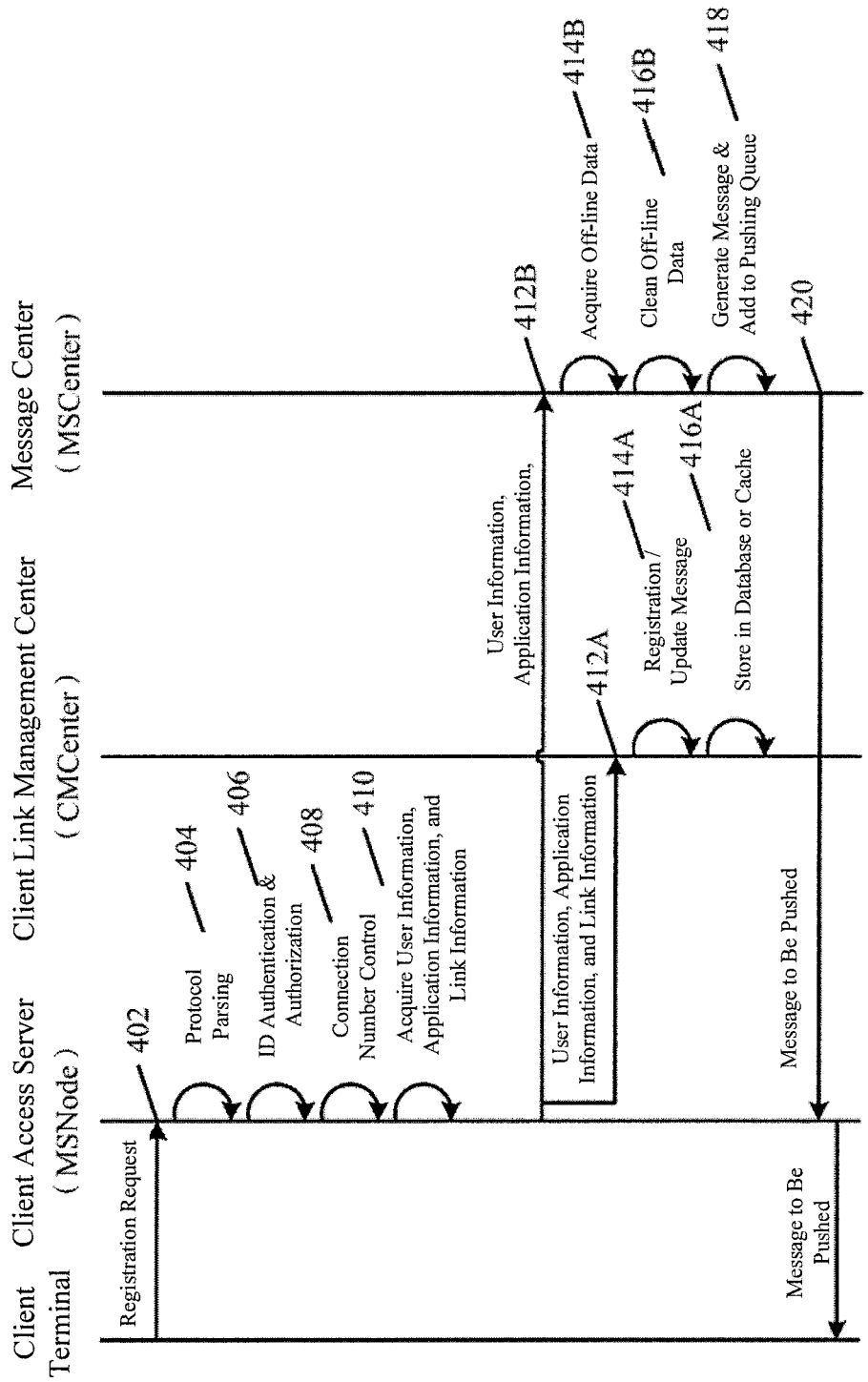
FIG. 4 illustrates a processing flow chart of exemplary client registration, according to some embodiments of the present disclosure.
Figure 5:
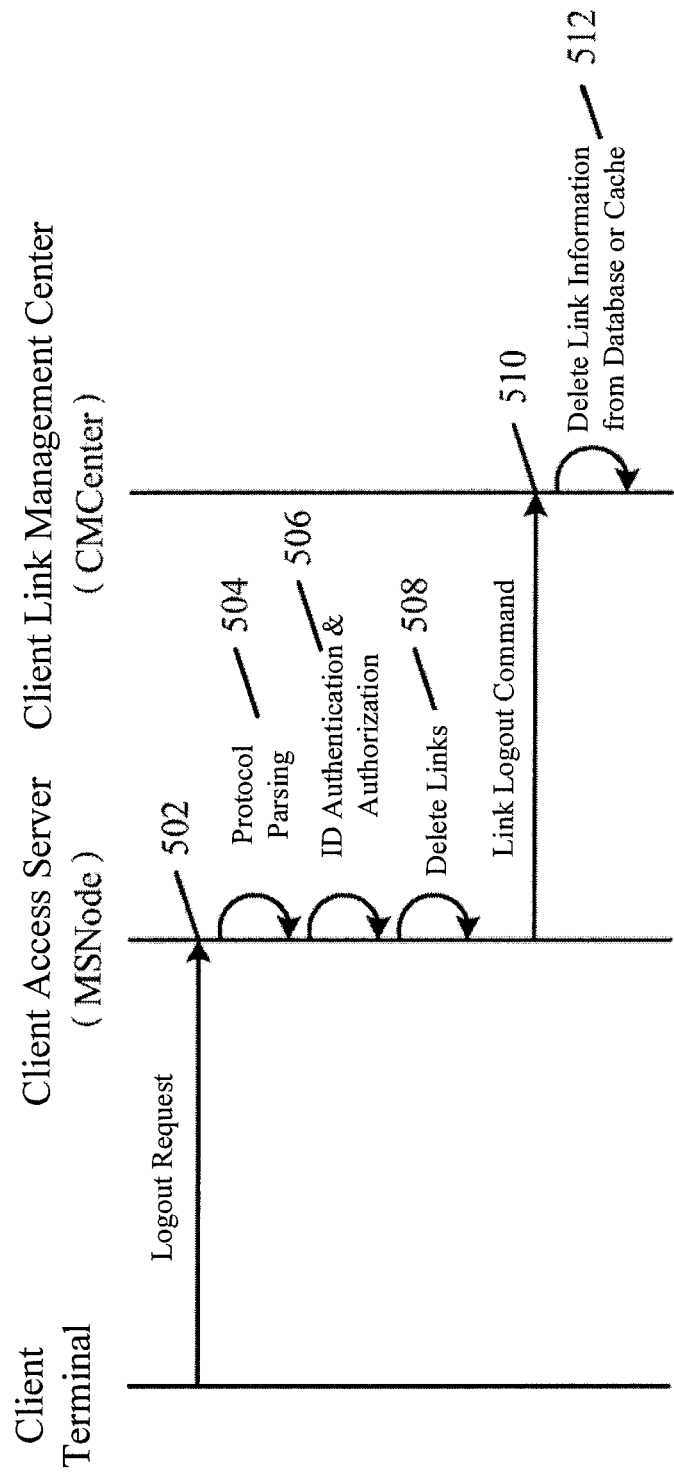
FIG. 5 shows a processing flow chart of exemplary client logout, according to some embodiments of the present disclosure.
Figure 6:
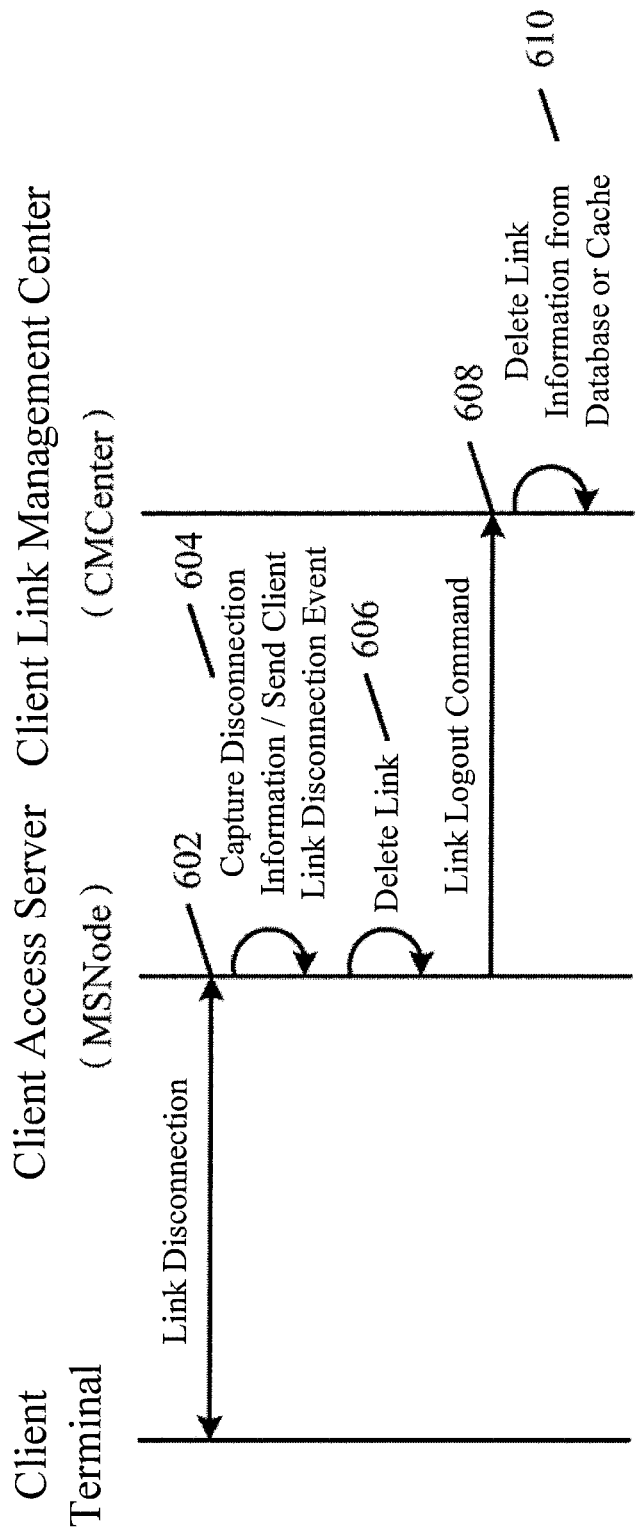
FIG. 6 is a processing flow chart of an exemplary abnormal disconnection of a client, according to some embodiments of the present disclosure.

FIGS. 4-6 illustrate several exemplary processes, including a client registration process, a corresponding logout process, and an abnormal disconnection process. These processes are further described below.

1. Registration Process

FIG. 4 illustrates a processing flow chart of exemplary client registration, according to some embodiments of the present disclosure. As shown in FIG. 4, a registration procedure may include the following steps:

Step 402: Initiate, by a client, a registration request to a current MSNode node.

Step 404: Parse, by the current MSNode node, a protocol of the registration request.

Step 406: Perform, by the current MSNode node based on a protocol parsing result, identity authentication and authorization on a user account that initiates the registration request.

Step 408: Control a number of connections on the current MSNode node that processes the registration request.

In some embodiments, the MSNode may be a server cluster containing a plurality of nodes. Each MSNode node may be configured with a preset number of connections. If the current MSNode node detects that the number of established connections exceeds the preset number of connections, the current registration request may be allocated to another idle MSNode node.

The current MSNode node may return a route instruction to the client to guide and re-connect the client to another idle MSNode node.

Step 410: Acquire, by the current MSNode node, user information and/or application information from the registration request, and extract link information from an established link.

Step 412A: Send, by the current MSNode node, the user information, the application information, and the link information to a CMCenter.

Step 414A: Update data in accordance with the received user information, application information, and link information if client registration information about the user account exists in the CMCenter. Register as new client registration information if client registration information about the user account does not exist.

Step 416A: Store, by the CMCenter, the client registration information in a link management database or a distributed cache system.

Step 412B: Send, by the current MSNode node, the user information and the application information to the MSCenter.

Step 414B: Acquire, by the current MSCenter node, the corresponding off-line data in accordance with the user information and the application information.

Step 416B: Clean, by the current MSCenter node, the off-line data.

Step 418: Generate, by the current MSCenter node, a message to be pushed from the processed off-line data, and add the message to a message pushing queue.

Step 420: Acquire, by the current MSNode node, the message to be pushed from the message pushing queue, and push the message to the client.

2. Logout Process

FIG. 5 shows a processing flow chart of exemplary client logout, according to some embodiments of the present disclosure. As shown in FIG. 5, the client logout procedure may include the following steps:

Step 502: Initiate, by a client, a logout request to a current MSNode node.

Step 504: Parse, by the current MSNode node, a protocol of the received logout request.

Step 506: Perform, by the current MSNode node based on a protocol parsing result, identity authentication and authorization on the client.

Step 508: Acquire, by the current MSNode node, user information and application information contained in the logout request, and delete all links established between the client and the current MSNode from a link manager.

Step 510: Send, by the current MSNode node, a link logout command to a CMCenter.

Step 512: Delete, by the CMCenter, connection information established between the current MSNode and the client, including deleting the corresponding link information from a database or a distributed cache. The client may be a device on which the client program is installed.

3. Abnormal Disconnection Process

FIG. 6 is a processing flow chart of an exemplary abnormal disconnection of a client, according to some embodiments of the present disclosure. As shown in FIG. 6, the abnormal disconnection procedure may include the following steps:

Step 602: A client being abnormally disconnected from an MSNode node.

Step 604: Capture, by the current MSNode node, abnormal disconnection information, and send a client link disconnection event.

Step 606: Acquire, in response to the client link disconnection event, link information registered by the client with the current MSNode from a link manager of the current MSNode node, and delete the link information.

Step 608: Send, by the current MSNode node, a link logout command to a CMCenter.

Step 610: Delete, by the C MCenter, connection information established between the current MSNode and the client, including deleting the corresponding link information from a database or a distributed cache.

By these procedures in FIGS. 4-6, the CMCenter may record the user information, the application information, and the link information as client registration information.

Figure 7:
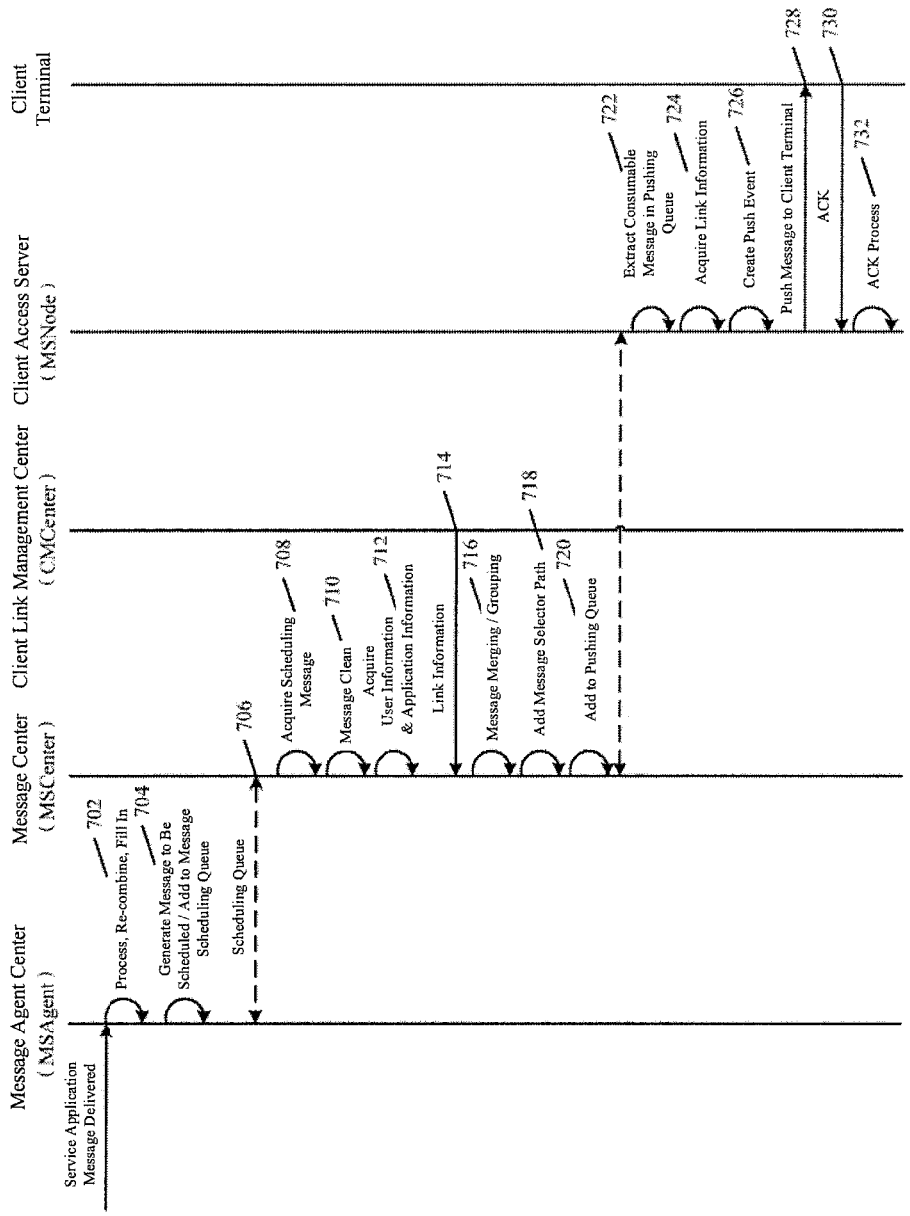
FIG. 7 is a flow chart of another exemplary method for pushing a message, according to some embodiments of the present disclosure.

The MSCenter may accurately push a message based on the recorded client registration information. Referring to FIG. 7, a message pushing process may be described in detail below. FIG. 7 is a flow chart of another exemplary method for pushing a message, according to some embodiments of the present disclosure. As shown in FIG. 7, when the real-time message platform shown in FIG. 1 may be used for pushing a message, the method may include the following steps:

Step 702: Receive, by a message agent center (MSAgent), a service application message delivered by a service server, and process, re-combine, and fill in the message in accordance with message header information in the message.

Step 704: Generate, by the MSAgent, a message to be scheduled based on the processed, re-combined, and filled-in message, and add the message to a message scheduling queue.

Step 706: Monitor, by a message center (MSCenter), whether a consumable message exists in the scheduling queue.

Step 708: Acquire, by the MSCenter, the consumable message if the consumable message exists in the scheduling queue.

Step 710: Clean, by the MSCenter, the message.

Step 712, Acquire, by the MSCenter, user information and application information from a message header of the message.

Step 714: Acquire, by the MSCenter, the corresponding link information from a client link management center (CMCenter) in accordance with the acquired user information and application information.

In some embodiments, the link information, as shown in FIGS. 4-6, may be stored in client registration information in a database or a distributed cache by the CMCenter.

Step 716: Merge or group, by the MSCenter, the messages in accordance with the user information, the application information, and the link information.

In some embodiments, the merging process and the grouping process above may be applied to different scenarios. The two processes are described below.

1) Merging Process

In a scenario where a user may log in by the same user account respectively on a plurality of applications on the same device, the merging process may be performed on the messages so that only one message may need to be pushed to the device. The plurality of applications may acquire the corresponding message contents accordingly. It may decrease the data volume of pushed messages, and may reduce power consumption of the device. Especially for a mobile terminal device, this method may be helpful to reduce the data traffic consumption and prolong the standby time.

Figure 8:
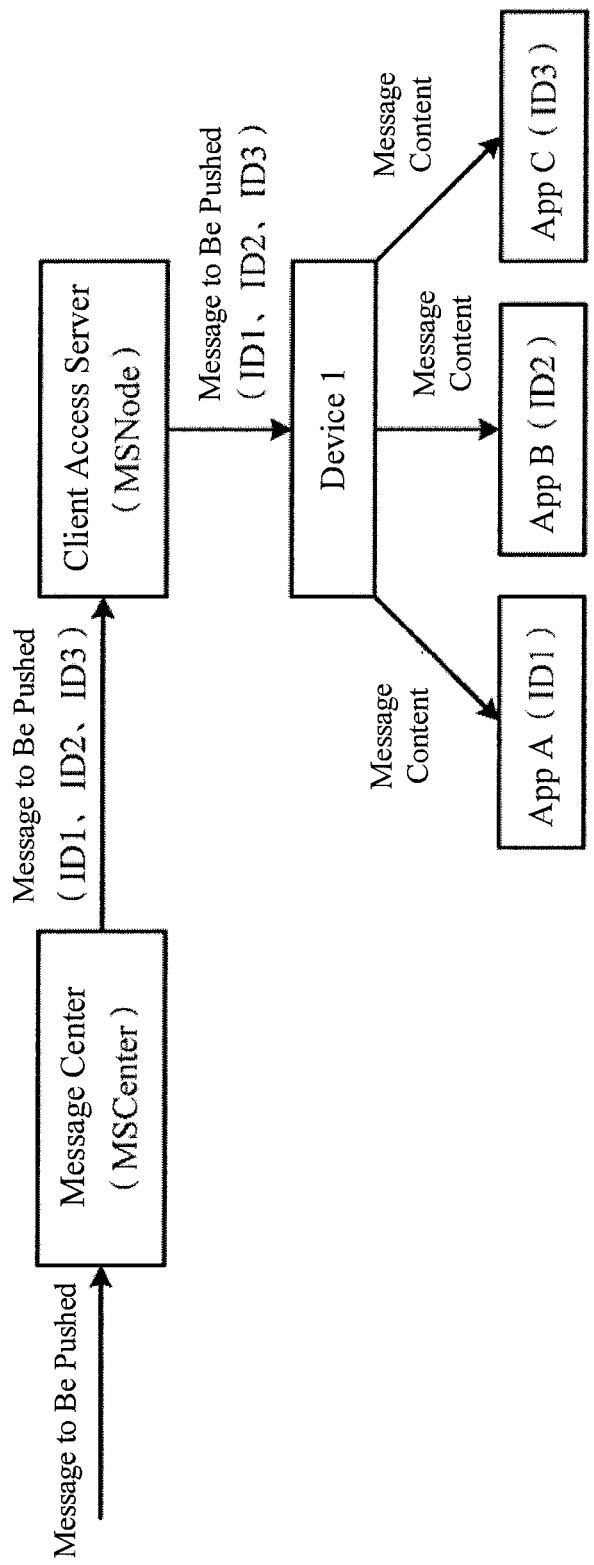
FIG. 8 shows a schematic diagram of an exemplary merging process, according to some embodiments of the present disclosure.

FIG. 8 shows a schematic diagram of an exemplary merging process, according to some embodiments of the present disclosure. As shown in FIG. 8, a user may use the same user account, and may respectively log in on an application A, an application B, and an application C on a device 1. After detecting a message to be pushed in a message scheduling queue, the MSCenter may be configured to extract user information, e.g., user ID=111, and application information, e.g., one of application ID1=A, application ID2=B, or application ID3=C, in a message header of the message. The MSCenter may also be configured to acquire the corresponding link information, e.g., one of device ID=1 or device ID1=device ID2= . . . =1, from a CMCenter. The MSCenter may further configured to determine that the same user account corresponds to device 1 and application A, application B, and application C on device 1. This is the scenario where a plurality of applications correspond to the same device.

Accordingly, the MSCenter may be configured to extract IDs of the application A, the application B, and the application C from link metadata information, such as application ID1, application ID2, and application ID3. The MSCenter may also be configured to add all the ID information to the same message, and add the message to a message pushing queue. After acquiring the message from the message pushing queue, the MSNode may be configured to directly send the message to device 1.

Correspondingly, after receiving the pushed message, device 1 may be configured to acquire the ID information, i.e., application ID1, application ID2, and application ID3, and message contents contained in the received message by parsing the received message. Device 1 may also configured to send the message contents to application A, application B, and application C corresponding to application ID1, application ID2, and application ID3, respectively.

By the above merging process, although application A, application B, and application C on the device 1 all have the user account logged in, the method may need only one message to be pushed. All the applications may obtain the corresponding message contents accordingly. It may effectively decrease the data volume of messages to be pushed, especially when the device 1 may be a mobile device. As a result, the data traffic consumption may be reduced accordingly. Moreover, message pushing may be performed directly via only one link with the MSNode. It may reduce power consumption of the device 1, and may also save electric quantity of power supply.

2) Grouping Process

In a scenario where a user may log in by the same user account on the same application on a plurality of devices, the grouping process on messages may be performed so that each of the devices may receive the same pushed message. The user may be able to read the corresponding pushed message via any one of the devices. It may be helpful to avoid missing the message.

Figure 9:
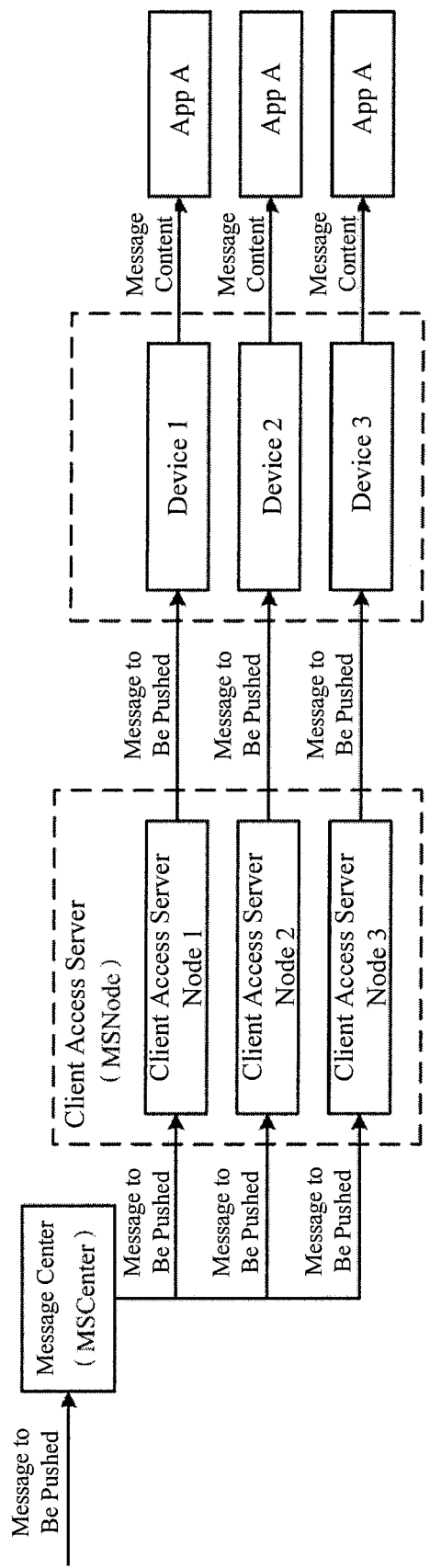
FIG. 9 is a schematic diagram of an exemplary grouping process, according to some embodiments of the present disclosure.

FIG. 9 is a schematic diagram of an exemplary grouping process, according to some embodiments of the present disclosure. As shown in FIG. 9, a user may use the same user account to log in on the same application A on a device 1, a device 2 and a device 3, respectively. After detecting a message to be pushed from a message scheduling queue, the MSCenter may be configured to extract user information, e.g., user ID=111, and application information, e.g., application ID=A, in a message header of the message, and acquire the corresponding link information, e.g., device ID1=1, device ID2=2, or device ID3=3, from a CMCenter. The MSCenter may also be configured to determine that the same user account corresponds to the application A on the device 1, the device 2 and the device 3. This is the scenario where a plurality of devices may correspond to the same application.

Accordingly, the MSCenter may take each device as a group, may divide one message to be pushed into a plurality of messages that are one-to-one corresponding to the plurality of devices, and may push the plurality of messages via an MSNode. The MSCenter may determine an MSNode node corresponding to each of the devices in accordance with link information. For example, as shown in FIG. 9, the device 1 may correspond to an MSNode node 1, the device 2 may correspond to an MSNode node 2, and the device 3 may correspond to an MSNode node 3. An ID of the MSNode node 1, an ID of the MSNode node 2, and an ID of the MSNode node 3 may be respectively added to their corresponding messages to be pushed. The messages to be pushed may be added to a message pushing queue. Each of the MSNode nodes may select the corresponding message to be pushed from the message pushing queue in accordance with the ID thereof and may perform a pushing operation, such as pushing the corresponding message to the device 2 via the MSNode node 2 or pushing the corresponding message to the device 3 via the MSNode node 3.

Referring back to FIG. 7, after the message merging/grouping of step 716, the following steps can be performed:

Step 718: Add, by the MSCenter, a message selector path into the message, e.g., a node ID of a client access server (MSNode) for pushing the message, in accordance with the link information.

Step 720: Add, by the MSCenter, the message to a pushing queue.

Step 722: Monitor, by the MSNode, whether a consumable message exists in the pushing queue. If a consumable message exists in the pushing queue, extract the corresponding message from the pushing queue. The MSNode may generally contain a plurality of nodes, and each node may have a corresponding unique ID. By detecting a node ID contained in each message in the pushing queue, the message may be extracted and processed by the corresponding node.

Step 724: Acquire, by the MSNode, the link information from the extracted message, and read a link connection instance corresponding to the link information from a local link manager.

Step 726: Encapsulate, by the MSNode, the link connection instance and the message content in the message into a pushing event, and broadcast it.

Step 728: Push, by a local pushing event listener of the MSNode, the message content to the client using the corresponding link connection instance after receiving the broadcast pushing event.

Step 730: Return, by the client, an acknowledgment (ACK) after receiving the pushed message content.

Step 732: Perform, by the MSNode, a certain process in accordance with a receiving condition of the ACK.

In some embodiments, if the MSNode has not received the ACK from the client within a specified period of time, a re-sending operation may be performed in step 732. In some embodiments, when the re-sending operation may be performed for a certain number of times, the message may be sent to a failure processing queue. A failure message processor may perform a grading process on messages in accordance with a type of the failure queue. For example, for a Front type queue, the message re-sending may be attempted. Messages in a Backend queue may be recovered manually to the Front queue, or may be re-sent directly by a manual trigger. Messages in a dead letter queue (DLQ) may only be re-sent by a manual trigger.

Figure 10:
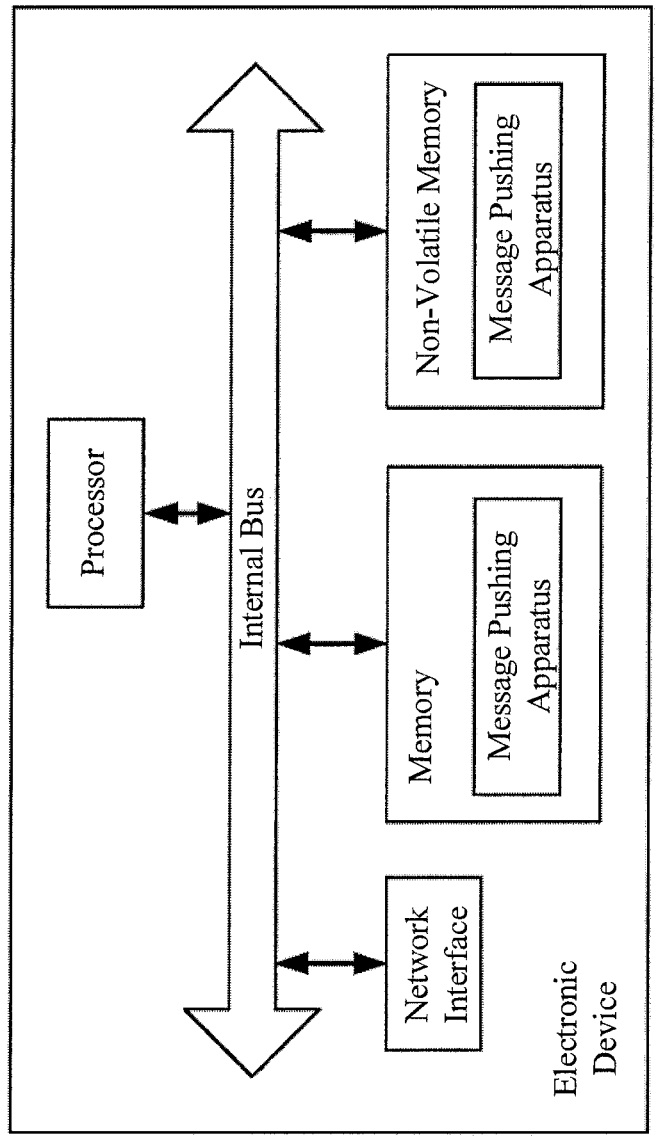
FIG. 10 illustrates a schematic structural diagram of an exemplary electronic device, according to some embodiments of the present disclosure.

FIG. 10 illustrates a schematic structural diagram of an exemplary electronic device corresponding to an MSCenter, according to some embodiments of the present disclosure. Referring to FIG. 10, at the hardware level, the electronic device may include a processor, an internal bus, a network interface, a memory, and a non-volatile memory. In some embodiments, the electronic device may also include additional hardware required by other services. The processor may be configured to read the corresponding computer program from the non-volatile memory into the memory for execution. The processor at the logical level may be configured to be an apparatus for pushing a message. In addition to software implementation, the present disclosure does not exclude any other implementations, such as a logical device or a method combining hardware and software. The execution entities of the following procedures may not be limited to various logical units, and may also be hardware or a logical device.

Figure 11:
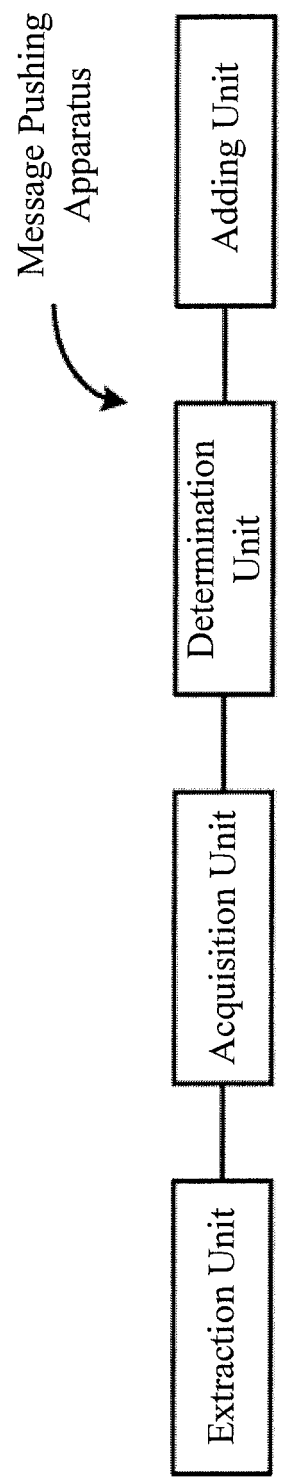
FIG. 11 is a block diagram of an exemplary apparatus for pushing a message, according to some embodiments of the present disclosure.

FIG. 11 is a block diagram of an exemplary apparatus for pushing a message, according to some embodiments of the present disclosure. In some embodiments, an apparatus for pushing a message may include an extraction unit, an acquisition unit, a determination unit and a pushing unit.

The extraction unit may be configured to extract, when the message to be pushed is detected, user information and application information in the message.

The acquisition unit may be configured to acquire link information corresponding to the user information and the application information.

The determination unit may be configured to determine registered devices of a user account and registered applications on each registered device in accordance with the user information, the application information, and the link information.

The adding unit may be configured to add, when a plurality of registered applications on a registered device exist, identification information about the plurality of registered applications to the message corresponding to the registered device. The identification information and message contents contained in the message may be extracted and the message contents may be respectively sent to each registered application corresponding to the identification information by the registered device after receiving the message.

In some embodiments, the apparatus for pushing the message may further include a pushing unit configured to push, when a plurality of registered devices corresponding to the user account exist, the message to each registered device.

In some embodiments, the pushing unit may be configured to duplicate the message to obtain a plurality of messages corresponding to the plurality of registered devices. The pushing unit may also be configured to acquire a node identity (ID) of a client access server corresponding to each registered device, and add each node ID to each corresponding message. The pushing unit may further be configured to add the plurality of messages each containing the node ID to a message pushing queue.

In some embodiments, the acquisition unit may be configured to acquire, from a client link management center, link information corresponding to the user information and the application information. The link information may be acquired from a link established with a device when the client access server registers the device.

Figure 12:
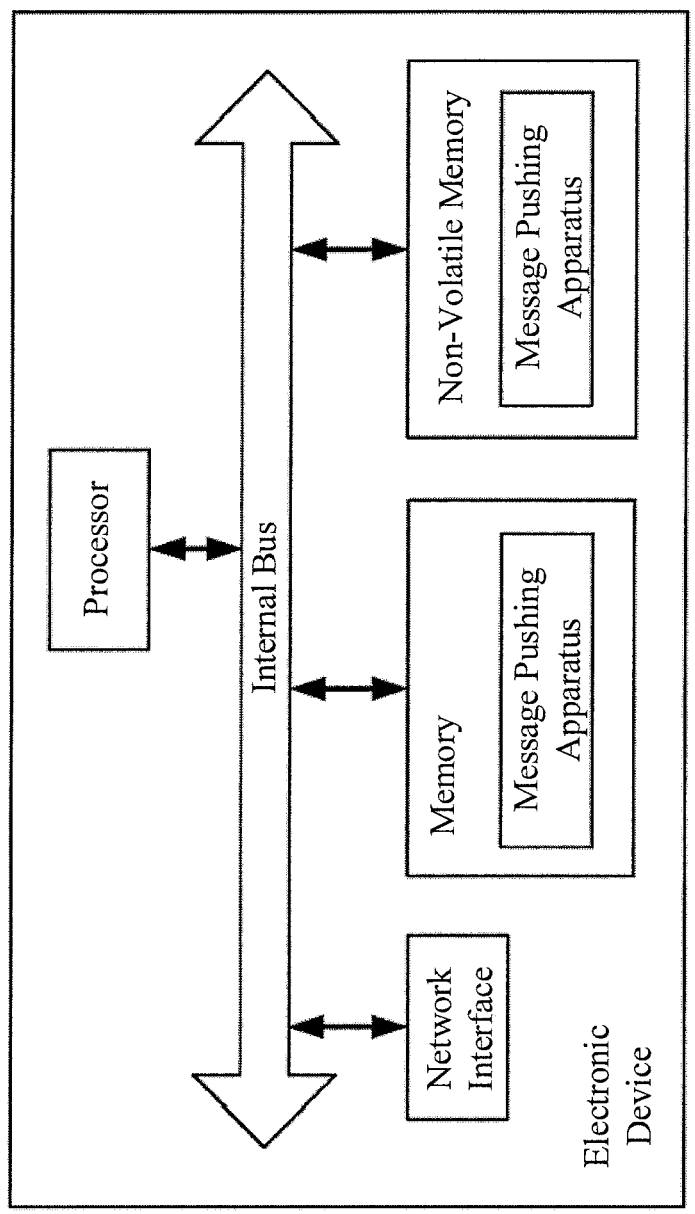
FIG. 12 shows a schematic structural diagram of another exemplary electronic device, according to some embodiments of the present disclosure.

FIG. 12 shows a schematic structural diagram of another exemplary electronic device, according to some embodiments of the present disclosure. At the hardware level, the electronic device may include a processor, an internal bus, a network interface, a memory and a non-volatile memory. In some embodiments, the electronic device may also include additional hardware required by other services. The processor may read the corresponding computer program from the non-volatile memory into the memory for execution. In some embodiments, the processor at the logical level may be configured to form an apparatus for pushing a message. In addition to software implementation, the present disclosure does not exclude any other implementations, such as a logical device or a method combining hardware and software. The execution entities of the following processing procedure may not be limited to various logical units, and may also be hardware or a logical device.

Figure 13:
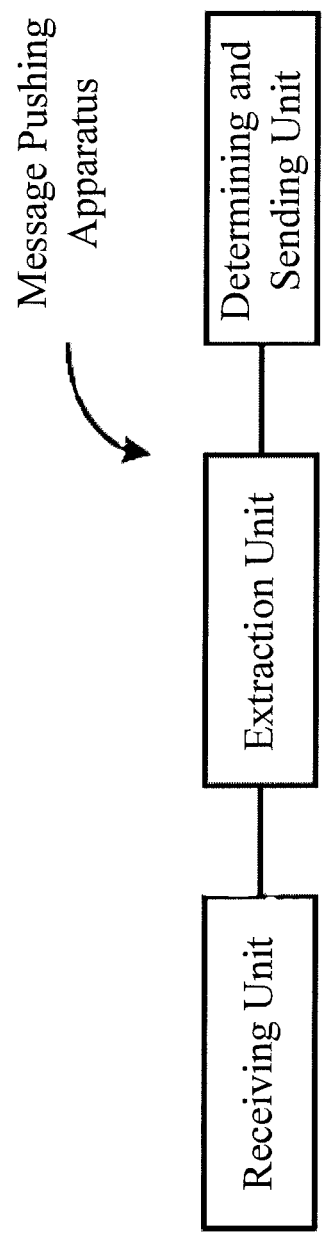
FIG. 13 is a block diagram of another exemplary apparatus for pushing a message, according to some embodiments of the present disclosure.

FIG. 13 is a block diagram of another exemplary apparatus for pushing a message, according to some embodiments of the present disclosure. In some embodiments, an apparatus for pushing a message may include a receiving unit, an extraction unit, and a sending unit.

The receiving unit may be configured to receive a pushed message.

The extraction unit may be configured to extract message contents and identification information contained in the pushed message.

The determining and sending unit may be configured to determine a target application corresponding to each piece of the identification information, and send the message contents to each corresponding target application.

In a typical configuration, a computing device may include one or more processors (CPUs), an input/output interface, a network interface and a memory.

The memory may include a non-permanent memory, a random access memory (RAM) and/or a non-volatile memory, such as a read-only memory (ROM) or flash memory (flash RAM), in computer-readable media. The memory may be an example of the computer-readable media.

The computer-readable media may include permanent and non-permanent, removable and non-removable media and may realize information storage with any method or technology. The information may be a computer-readable instruction, data structure, program module or other data. The examples of computer storage media may include but are not limited to a phase change memory (PRAM), static random access memory (SRAM), dynamic random access memory (DRAM), other types of random access memories (RAMs), read-only memory (ROM), electrically erasable programmable read-only memory (EEPROM), flash memory or other memory technologies, compact disk read-only memory (CD-ROM), digital versatile disc (DVD) or other optical storage, magnetic cassette tape, magnetic tape and magnetic disk storage or other magnetic storage devices or any other non-transmission media, which can be used to store information that can be accessed by a computing device. According to the definition herein, the computer-readable media do not include transitory media, such as modulated data signals and carriers.

It also needs to be noted that the terms "include," "comprise," or any other variations thereof are intended to cover a non-exclusive inclusion. Therefore, in the context of a process, method, merchant, or device that includes a series of elements, the process, method, merchant, or device may not only include such elements, but may also include other elements not specified explicitly, or may also include inherent elements of the process, method, merchant, or device. If there are no more limitations, elements defined by "comprising a" do not exclude the situation where other identical elements exist in the process, method, merchant or device including the elements.

The descriptions presented above are only preferred embodiments of the present disclosure, and are not intended to limit the present disclosure. Any modification, equivalent replacement, improvement, etc. within the spirit and principle of the present application shall all fall within the scope of protection of the present disclosure.

What is claimed is:

1. A method for pushing a message, the method comprising:
    extracting, when the message to be pushed is detected, user information and application information in the message;
    acquiring, from a client link management center, link information corresponding to the user information and the application information and based on a link established between a device and a client access server in response to the client access server registering the device, the link information comprising a device ID associated with the registered device that has established the link with the client access server;
    in response to a plurality of registered applications having been logged in with the user information on the registered device, identifying, in accordance with the user information, the application information, and the device ID, the registered device corresponding to the user information and the plurality of registered applications logged in with the same user information on the registered device, wherein the registered device is one of a plurality of registered devices; and
    adding, in response to an identification that the plurality of registered applications on the registered device have been logged in with the user information, identification information that identifies each of the plurality of registered applications to the message that corresponds to the registered device to enable the registered device, after receiving the message, to extract the identification information and message contents contained in the message and send the message contents respectively to each registered application of the plurality of registered applications corresponding to the identification information.

2. The method according to claim 1, further comprising:
    pushing, in response to a determination that the plurality of registered devices corresponding to the user information exist, the message to each registered device.

3. The method according to claim 2, wherein pushing, in response to the determination that the plurality of registered devices corresponding to the user information exist, the message to each registered device includes:
    duplicating the message to obtain a plurality of messages corresponding to the plurality of registered devices;
    acquiring a node identity (ID) of the client access server corresponding to each registered device, and adding each node ID to each corresponding message; and
    adding the plurality of messages each containing the node ID to a message pushing queue.

4. An apparatus for pushing a message, the apparatus comprising:
    a memory storing a set of instructions; and
    one or more processors configured to execute the set of instructions to cause the apparatus to perform:
        extracting, when the message to be pushed is detected, user information and application information in the message,
        acquiring, from a client link management center, link information corresponding to the user information and the application information and based on a link established between a device and a client access server in response to the client access server registering the device, the link information comprising a device ID associated with the registered device that has established the link with the client access server, in response to a plurality of registered applications having been logged in with the user information on the registered device, identifying, in accordance with the user information, the application information, and the device ID, the registered device corresponding to the user information and the plurality of registered applications logged in with the same user information on the registered device, wherein the registered device is one of a plurality of registered devices; and adding, in response to an identification that the plurality of registered applications on the registered device have been logged in with the user information, identification information that identifies each of the plurality of registered applications to the message that corresponds to the registered device to enable the registered device, after receiving the message, to extract the identification information and message contents contained in the message and send the message contents respectively to each registered application of the plurality of registered applications corresponding to the identification information.

5. The apparatus according to claim 4, wherein the one or more processors are configured to execute the set of instructions to cause the apparatus to further perform:

pushing, in response to a determination that the plurality of registered devices corresponding to the user information exist, the message to each registered device.

6. The apparatus according to claim 5, wherein pushing, in response to the determination that the plurality of registered devices corresponding to the user information exist, the message to each registered device comprises:

duplicating the message to obtain a plurality of messages corresponding to the plurality of registered devices;

acquiring a node identity (ID) of the client access server corresponding to each registered device, and add each node ID to each corresponding message; and adding the plurality of messages each containing the node ID to a message pushing queue.

7. A non-transitory computer readable medium that stores a set of instructions that is executable by at least one processor of an apparatus to cause the apparatus to perform a method for pushing a message, the method comprising:

extracting, when the message to be pushed is detected, user information and application information in the message;

acquiring, from a client link management center, link information corresponding to the user information and the application information and based on a link established between a device and a client access server in response to the client access server registering the device, the link information comprising a device ID associated with the registered device that has established the link with the client access server;

in response to a plurality of registered applications having been logged in with the user information on the registered device, identifying, in accordance with the user information, the application information, and the device ID, the registered device corresponding to the user information and the plurality of registered applications logged in with the same user information on the registered device, wherein the registered device is one of a plurality of registered devices; and adding, in response to an identification that the plurality of registered applications on the registered device have been logged in with the user information, identification information that identifies each of the plurality of registered applications to the message that corresponds to the registered device to enable the registered device, after receiving the message, to extract the identification information and message contents contained in the message and send the message contents respectively to each registered application of the plurality of registered applications corresponding to the identification information.

8. The non-transitory computer-readable medium of claim 7, wherein the at least one processor is configured to execute the set of instructions to cause the apparatus to further perform:

pushing, in response to a determination that the plurality of registered devices corresponding to the user information exist, the message to each registered device.

9. The non-transitory computer-readable medium of claim 8, wherein pushing, in response to the determination that the plurality of registered devices corresponding to the user information exist, the message to each registered device includes:

duplicating the message to obtain a plurality of messages corresponding to the plurality of registered devices;

acquiring a node identity (ID) of the client access server corresponding to each registered device, and adding each node ID to each corresponding message; and adding the plurality of messages each containing the node ID to a message pushing queue.

* * * * *